(12) United States Patent
Arsenault (10) Patent No.: US 6,310,661 B1
(45) Date of Patent: Oct. 30, 2001

(54) METHOD OF BROADCASTING CONTROLLING DATA STREAMS AND APPARATUS FOR RECEIVING THE SAME

(75) Inventor: Robert G. Arsenault, Redondo Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/130,867

(22) Filed: Aug. 7, 1998

(51) Int. Cl.[7] .............................. H04N 9/74; H04N 5/50; H04N 5/268; H04N 5/44
(52) U.S. Cl. ..................... 348/725; 348/725; 348/584; 348/569; 348/706; 348/707; 348/906; 725/131; 725/132; 725/139; 725/140; 725/64; 725/65
(58) Field of Search ................. 348/10, 12, 13, 348/7, 584, 725, 569, 705, 706, 906; 455/4.2, 5.1, 6.2, 6.3; 725/131, 132, 139, 140, 63, 64, 67, 68; H04N 5/268

(56) References Cited

U.S. PATENT DOCUMENTS

| | | | |
|---|---|---|---|
| 5,319,707 | * | 6/1994 | Wasilewski et al. ................. 380/14 |
| 5,734,589 | * | 3/1998 | Kostreski et al. .................... 364/514 |
| 5,767,913 | * | 6/1998 | Kassatly ............................... 348/403 |
| 5,886,995 | * | 3/1999 | Arsenault et al. .................... 370/477 |
| 5,894,320 | * | 4/1999 | Vancelette ................................ 348/7 |
| 5,932,362 | * | 7/1999 | Klosterman ............................ 348/12 |
| 6,009,116 | * | 12/1999 | Bednarek et al. .................... 375/200 |
| 6,009,307 | | 12/1999 | Granata et al. ...................... 455/133 |
| 6,052,554 | * | 4/2000 | Hendricks et al. ................... 455/5.1 |
| 6,208,636 | | 3/2001 | Tawill et al. ......................... 370/351 |

* cited by examiner

Primary Examiner—Reinhard J. Eisenzopf
Assistant Examiner—Paulos Natnael
(74) Attorney, Agent, or Firm—John A. Crook; Michael W. Sales (57) ABSTRACT

A method of broadcasting controlling data streams and remote receiving apparatus for using the same are disclosed. A viewer-channel-to-broadcast channel (VCBC) map is employed to map one or more controlling data streams to one or more channels. The VCBC map is stored in memory. When a user tunes to a channel, the VCBC map is checked to determine if a controlling data stream is associated with the tuned channel. The VCBC map is periodically updated and broadcasted.

143 Claims, 5 Drawing Sheets

|  | SAT. A | SAT. B | SAT. C |
|---|---|---|---|
| CHANNEL 101<br>VIDEO<br>AUDIO<br>CONTROL | VIDEO 101<br>AUDIO 101<br>CDS 101 | 3000 | 3000 |
| CHANNEL 102<br>VIDEO<br>AUDIO<br>CONTROL | 3001 | VIDEO 102<br>AUDIO 102<br>CDS 102 | 3001 |
| CHANNEL 103<br>VIDEO<br>AUDIO<br>CONTROL | 3002 | 3002 | VIDEO 103<br>AUDIO 103<br>CDS 103 |
| ... | ... | ... | ... |

METHOD OF BROADCASTING CONTROLLING DATA STREAMS AND APPARATUS FOR RECEIVING THE SAME

BACKGROUND OF THE INVENTION

1. Field of the Invention

The present invention relates generally to broadcast communication systems and, more particularly, to the use of controlling data streams to effect the operation of remote receiving apparatus such as televisions, stereo receivers, computers, video cassette recorders and integrated receiver decoders.

2. Description of Related Art

In recent years multimedia apparatus and applications have become extremely popular. For example, computer programs are now often designed to provide the user with visually stimulating graphical presentations punctuated by stereo sound. Similarly, television programs are now commonly broadcast in stereo and surround sound modes to provide an enhanced aural experience for viewers.

Also in recent years, the direct satellite system for digitally transmitting communication signals to individual users has come into being. The ability of the direct satellite system to transmit on the order of 150 channels of digital information over a single satellite to multiple end users offers unprecedented communications opportunities.

U.S. Pat. No. 4,694,490 to Harvey et al. generally discloses a control and monitoring apparatus for governing or influencing the operation of remote apparatus via signals embedded in television and radio transmissions. Exemplary uses of the disclosed apparatus mentioned by Harvey et al. include: (a) stereo simulcasts where the apparatus automatically routes video signals to an associated television and automatically causes an associated stereo tuner to tune in and play a corresponding audio program; (b) automatically recording or printing news information concerning predetermined companies selected by a user; (c) recording stock information for predetermined companies and causing a computer to generate and display graphical images reflecting the particularized stock information during a generally broadcasted television program concerning a related topic; and (d) downloading a copy of a recipe to a local printer in response to a signal associated with a television program concerning food preparation. As can be seen from these examples, one purpose of the device described in the Harvey et al. disclosure is to provide increased integration of remote apparatus such as televisions, stereos, computers and printers to provide enhanced multimedia presentations.

Prior art references, however, have been limited in that they do not provide means for selecting preferred modes of operation of remote receiving apparatus. Nor do they provide means for addressing predetermined models of remote receiving apparatus.

Moreover, with the rising popularity of the digital satellite system, new problems have arisen. For example, satellite service broadcasters have a need to grow and expand into new orbital slots via the introduction of additional satellites. In order to ensure appropriate end users have access to the programming transmitted over multiple satellites, it becomes necessary to provide the end user with information associating predetermined is programming with particular satellites such that the user can tune to desired programming.

SUMMARY OF THE INVENTION

In accordance with an aspect of the invention, a remote receiving apparatus for use with a broadcast communication system for delivering a plurality of channels to a plurality of remote users is provided. The remote receiving apparatus includes an output port; a first antenna receiving element for receiving information from the broadcast communication system; and a logic circuit coupled to the first antenna receiving element. The logic circuit has an associated memory and an associated tuner. The tuner is adapted to select a tuned channel from the plurality of channels. The logic circuit receives a viewer-channel-to-broadcast-channel (VCBC) map and stores the VCBC map in the memory. The VCBC map maps a first controlling data stream to a first one of the plurality of channels and a second controlling data stream to a second one of the plurality of channels. When the tuner selects the first one of the channels, the logic circuit addresses the VCBC map and outputs the first controlling data stream to the output port and, when the tuner selects the second one of the channels, the logic circuit addresses the VCBC map and outputs the second controlling data stream to the output port.

In some embodiments, at least a portion of the VCBC map is broadcasted periodically. In such embodiments, the periodic broadcasts of the VCBC map preferably update the VCBC map stored in the memory.

In any of the foregoing embodiments, the VCBC map can optionally store a controlling data stream for each of the channels. Alternatively, the VCBC map can optionally store controlling data streams for less than all of the channels.

In some embodiments, the remote receiving apparatus is further provided with a first signal processing apparatus coupled to the output port. The first signal processing device has at least two modes of operation, and manipulates the information in a different manner to produce a different output in a first mode than in a second mode of operation. In such embodiments, when the tuner selects the first one of the channels, the first controlling data stream selects the mode of operation for the first signal processing apparatus. In such embodiments, the first controlling data stream may optionally be adapted to prioritize the first and second modes of operation of the first signalling apparatus such that, if a preferred mode of operation is not supported by the first signal processing apparatus, the first signal processing apparatus will enter a next preferred mode of operation. The next preferred mode may optionally be defined in the first controlling data stream.

In any of the foregoing embodiments, the remote receiving apparatus may optionally be provided with a second signal processing apparatus and a switching apparatus. In some such embodiments, the output port comprises first and second output ports, and the first signal processing apparatus is coupled to the first output port and the second signal processing apparatus is coupled to the second output port. Optionally, the switching apparatus is responsive to the first controlling data stream to route at least a first portion of a signal received on the tuned channel to a first selected one of the first and second signal processing apparatus. Optionally, the switching apparatus routes a second portion of the signal to a second selected one of the first and second signal processing apparatus.

In any of the foregoing embodiments, the remote receiving apparatus can optionally be provided with a switching device coupled to the output port, a first input port in communication with the first antenna receiving element, and a second input port in communication with a second antenna receiving element. In such embodiments, the switching device may optionally be adapted to switch between a first configuration wherein the first input port is coupled to the output port and a second configuration wherein the second input port is coupled to the output port. In such embodiments, the switching device is selectively responsive to the first controlling data stream to switch from the first configuration to the second configuration.

In any of the foregoing embodiments, the VCBC map can optionally store a first pathname identifying a location of the first controlling data stream in memory, and/or a second pathname identifying a location of the second controlling data stream in memory.

In any of the foregoing embodiments, the VCBC map may optionally map the first controlling data stream to two or more of the plurality of channels.

In any of the foregoing embodiments, the logic circuit may be adapted to receive and store the first and second controlling data streams in the memory.

In any of the above embodiments, the VCBC map can optionally be broadcasted more frequently than the first and second controlling data streams.

In accordance with another aspect of the invention, a method for use with a broadcast communication system for delivering a plurality of channels to a plurality of remote users is provided. The method comprises the steps of: developing a first VCBC map mapping a first controlling data stream to at least two of the plurality of channels; and broadcasting the first VCBC map.

In some embodiments, the first VCBC map maps the controlling data stream to at least two of the plurality of channels for a predefined time period.

In some embodiments, the method is further provided with the steps of: developing a second VCBC map mapping a second controlling data stream to at least one of the plurality of channels for a second predefined time period; and, broadcasting the second VCBC map.

In any of the foregoing embodiments, the step of developing the first VCBC map may further comprise the step of mapping a second controlling data stream to at least one of the plurality of channels.

In accordance with another aspect of the invention, a method for use with a broadcast communication system for delivering a plurality of channels to a plurality of remote users is provided. The method comprises the steps of: developing a first VCBC map mapping a first controlling data stream to at least a first one of the plurality of channels and a second controlling data stream to at least a second one of the plurality of channels; and broadcasting the first VCBC map.

In some embodiments, the first and second channels are identical. In other embodiments, the first and second channels are different.

In accordance with another aspect of the invention, a remote receiving apparatus is provided for use with a broadcast communication system for delivering a plurality of channels to a plurality of remote users. The remote receiving apparatus includes: an output port; a first antenna receiving element for receiving information from the broadcast communication system; and a logic circuit coupled to the first antenna receiving element and having an associated memory and an associated tuner. The tuner is adapted to select a tuned channel from the plurality of channels. The logic circuit receives a viewer-channel-to-broadcast-channel (VCBC) map and stores the VCBC map in the memory. The VCBC map maps a first controlling data stream to at least two of the plurality of channels. When the tuner selects one of the at least two channels, the logic circuit addresses the VCBC map and outputs the first controlling data stream to the output port.

Other features and advantages are inherent in the apparatus claimed and disclosed or will become apparent to those skilled in the art from the following detailed description and its accompanying drawings.

DESCRIPTION OF THE PREFERRED EMBODIMENT

Figure 1:
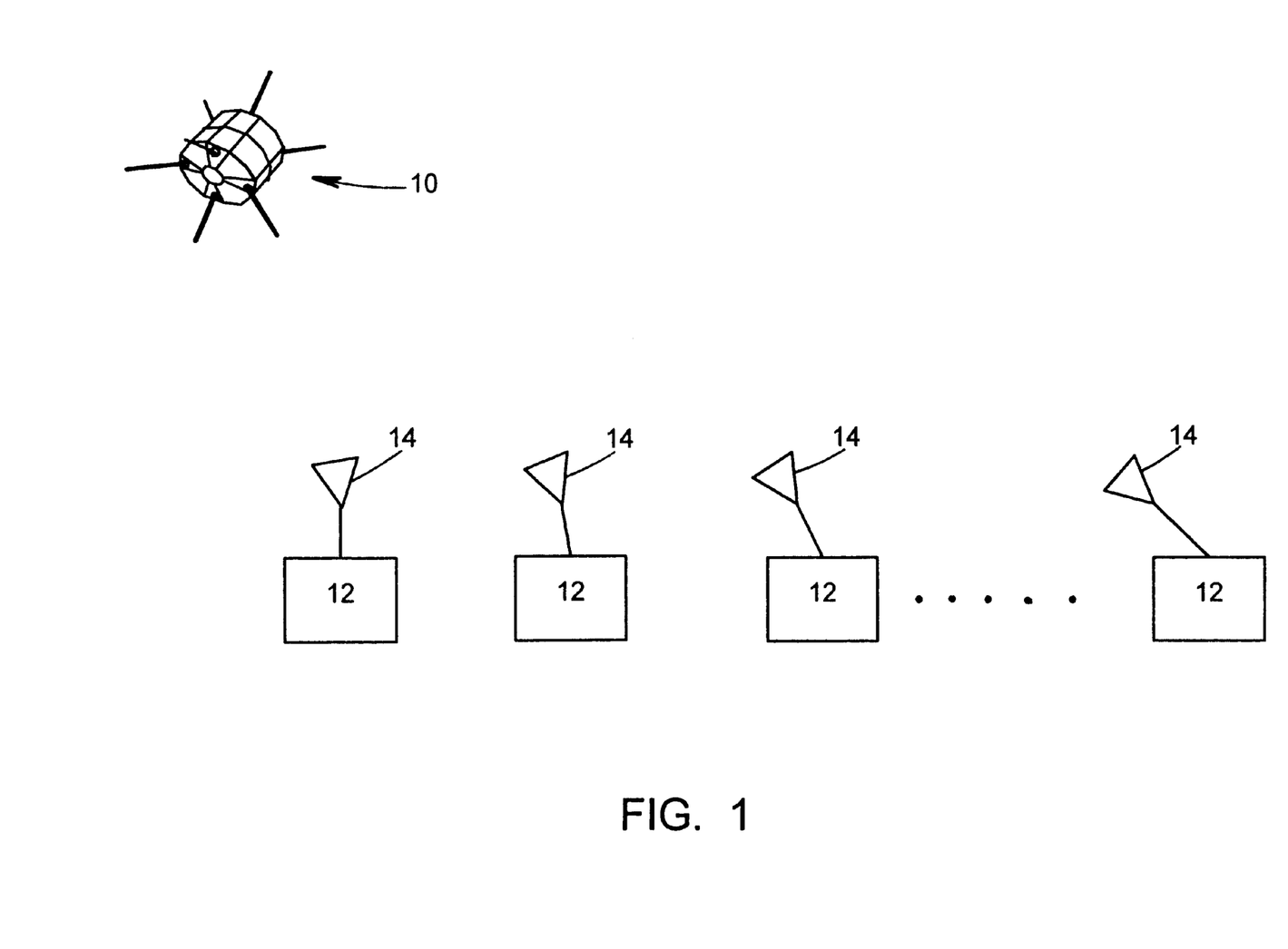
FIG. 1 is a block diagram representation of an exemplary broadcasting system employing one aspect of the invention.

FIG. 1 shows generally an exemplary broadcast communication system employing an aspect of the present invention. Although throughout the following description, the invention will be discussed in the context of a satellite-based communication system, those skilled in the art will appreciate that the invention is not limited to any particular type of system. On the contrary, the invention can be readily adapted to other communication system types including, by way of example, not limitation, cable systems, analog or digital terrestrial systems, and other wireless systems such as Multichannel Multipoint Distribution Systems (MMDS).

As used herein, the terms "signal" and "signals" refer to data modulated at a predetermined frequency, multiplexed data packets, time synchronized multiplexed data packets, and/or time synchronous multiplexed data packets.

Turning now to FIG. 1, an exemplary broadcast system operated in accordance with the teachings of the invention is illustrated. As shown in FIG. 1, a satellite transponder 10 transmits information to a plurality of remote receiving apparatus 12. It will be understood that the various remote receiving apparatus 12 can be disposed in residential or commercial buildings, located in vehicles, or alternatively implemented as portable devices capable of use at multiple locations including in the outdoors. In any event, the remote receiving apparatus 12 are each coupled in a conventional manner to an antenna 14 oriented in the direction of the satellite 10, preferably for optimal reception. As is known in the art, more than one remote receiving apparatus can be associated with a single antenna 14. Conversely, more than one antenna can be associated with a single remote receiving apparatus. For example, a direct duo antenna comprising a common reflector and two or more antenna receiving elements located at different foci of the reflector could be employed without departing from the scope of the invention.

As is also known in the art, the satellite transponder 10 is adapted to receive and broadcast a plurality of information or communication signals over a plurality of channels. The communication signals can be of any conventional type known in the art including without limitation audio signals, video signals and data signals. Similarly, the remote receiving apparatus 12 can have any of a plurality of known signal processing devices associated therewith including, but not limited to, analog, digital and/or High Definition television receivers, radio or stereo receivers, computers, video cassette recorders, printers, facsimile machines, laser disc players, DVD players, DVHS, hard disks and printers.

In accordance with the teachings of an important aspect of the invention, the signals broadcast by the satellite transponder 10 include one or more controlling data streams comprising at least one command code adapted to effect the operation of one or more of the remote receiving apparatus 12. To this end, one or more of the broadcasters employing the communication system: (a) generate one or more controlling data streams which are recognizable to one or more of the remote receiving apparatus 12; (b) associate the controlling data streams with the programming signals they are broadcasting; and (c) transmit the combined signal over the satellite transponder 10.

The controlling data streams may contain either general codes or custom codes. General codes are adapted to inform remote receiving apparatus 12 about a plurality of broadcast services or channels or to effect the operation of the remote receiving apparatus 12 when processing any of the plurality of broadcast channels. That is, controlling data streams containing general codes are one-to-many related. On the other hand, controlling data streams containing custom codes are associated with a particular channel of information. In other words, generally speaking custom codes are adapted to effect a particular function for a particular channel of information or to provide information pertaining to a specific channel.

Figure 2:
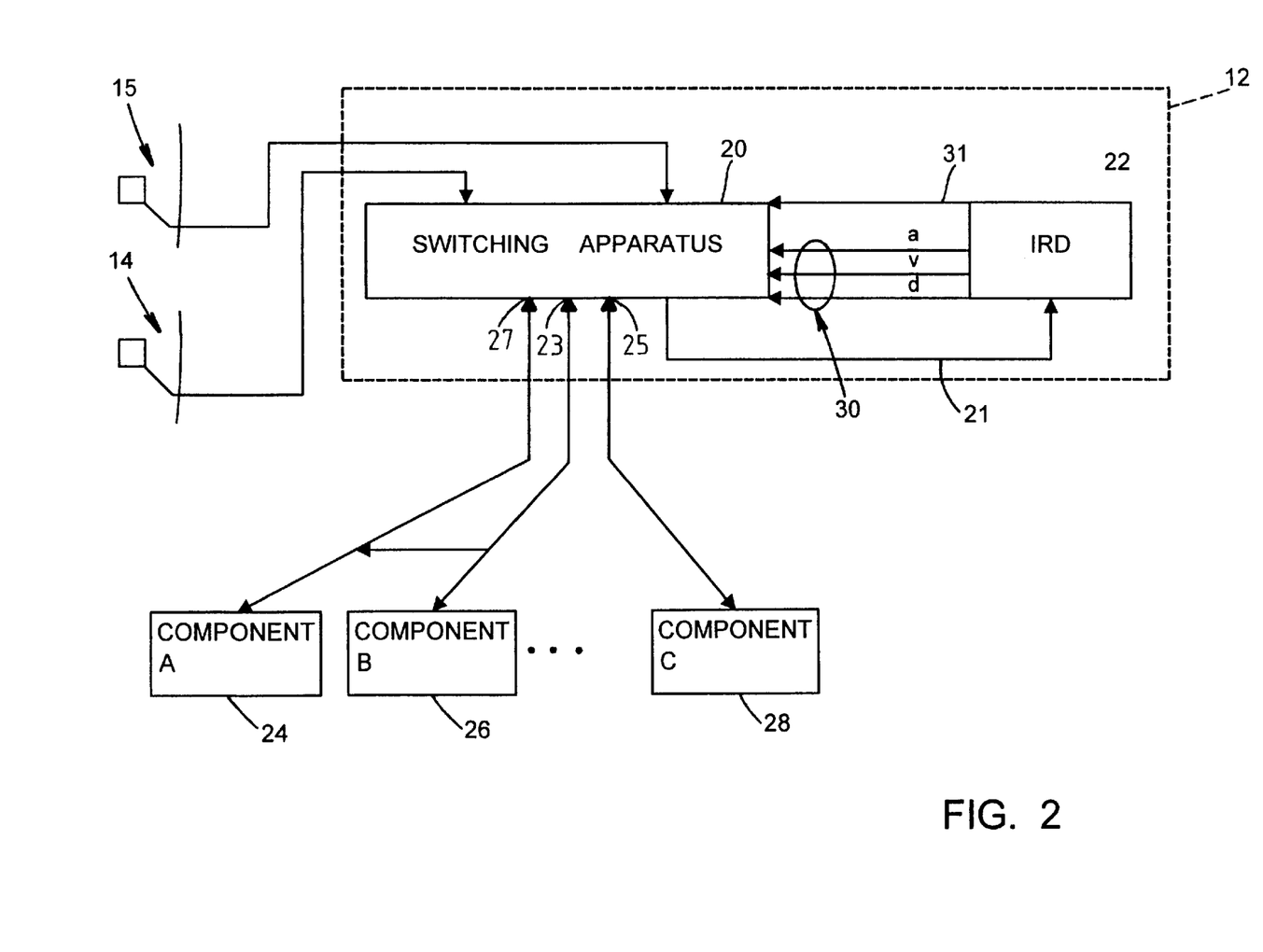
FIG. 2 is a block diagram representation of a remote receiving apparatus constructed in accordance with the teachings of the invention.

One possible implementation of a remote receiving apparatus 12 constructed in accordance with the teachings of the invention is shown in FIG. 2. Although, in the present description, the illustrated remote receiving apparatus 12 is particularly well suited for use in a satellite based broadcast system, those skilled in the art will appreciate that other forms of remote receiving apparatus can be employed without departing from the scope of the invention. For example, the remote receiving apparatus 12 could be implemented as a television receiver, audio signal processor, radio or stereo receiver, computer or video cassette recorder without departing from the scope of the invention.

For the purpose of routing received communication signals to appropriate peripherals 24, 26, 28, the remote receiving apparatus 12 illustrated in FIG. 2 is provided with a switching apparatus 20. As shown in FIG. 2, the switching apparatus 20 receives communication signals over one or more antennas 14, 15 and routes them over a databus 21 to an integrated receiver decoder 22. The switching device may optionally be located at the antenna receiving element.

The integrated receiver decoder (IRD) 22 is a well known commercially available device which is particularly adapted for tuning in broadcast communication signals from a satellite based system and thereafter decoding and processing the tuned signals. The IRD 22 typically has an associated tuner which is responsive to a user's input to select a tuned channel. It also typically includes a logic circuit such as a microprocessor for decoding received signals and performing other well known conventional control functions. As shown in FIG. 2, after decoding and processing the signals broadcast on the tuned channel, the IRD 22 communicates those signals to the switching apparatus 20 via data lines 30 and 31. Data lines 30 are preferably adapted to carry audio, video and data signals. Data line 31 is preferably adapted to carry the controlling data streams and other control signals. The data carried on lines 30, 31 can be in digital or analog formats and may comprise, without limitation, tones, pulse width modulated data, voltage levels, or optical IR codes.

As mentioned above, the IRD 22 sends the tuned audio, video, and data signals, along with the controlling data stream, to the switching apparatus 20. If the controlling data stream is recognized by the logic circuit of the switching apparatus 20 as being addressed to one or more peripherals, the audio, video, and data signals are routed to the peripherals 24, 26 and 28 specified in the controlling data stream. Peripherals may include, but are not limited to, high definition televisions, stereo amplifiers, video tape recorders, stock tickers, or computer terminals. For example, if the data that the IRD module 22 receives includes an audio portion and a visual portion, the corresponding controlling data stream could indicate that the audio signals should be routed to an audio signal processor such as a stereo amplifier and that the video signals should be routed to a video signal processor such as a television, and the switching apparatus 20 will act accordingly to route the signals to the specified devices. If the controlling data stream is not recognized by the switching apparatus 20 the controlling data stream is routed with the audio, video and data signals to all of the peripherals 24, 26 and 28 which will process the data as appropriate. Controlling data streams and other data sent to the peripherals 24, 26 and 28 that remain unrecognized will be ignored and will have no effect on the operation of the system.

The locations (addresses) of the system peripherals 24, 26 and 28 are known by the switching apparatus 20.

The locations of the peripherals 24, 26 and 28 are either programmed manually or are automatically found by the switching apparatus 20 via the electronic signatures of the peripherals 24, 26 and 28 in accordance with well known techniques.

Persons of ordinary skill in the art will appreciate that, although the switching apparatus 20 is illustrated as a single switch as shown in FIG. 2, it can also be implemented as a hierarchy or series of switches.

In accordance with the teachings of another aspect of the invention, the controlling data streams can be employed to effect various operations of a remote receiving apparatus. In one exemplary embodiment, the mode of operation of a signal processing apparatus such as a television or stereo receiver having at least two modes of operation is selected in a prioritized fashion by the controlling data streams. More specifically, the signal processing apparatus 24 has at least two modes of operation wherein the signal processing apparatus 24 manipulates the audio, video, or data signal routed via the switching apparatus 20 in a different manner to produce a different output in the first mode than in the second mode. For example, in the case of an audio signal processor such as a stereo amplifier implemented as the signal processing apparatus 24, the apparatus 24 could have a dolby® digital or AC3 mode, a surround sound mode, a stereo mode and a monaural mode. If a broadcaster transmits a movie in dolby® digital with an appropriate controlling data stream, the switching apparatus 20 would automatically route the video signal portion of the movie to a television receiver (in this example, peripheral 26) and the audio portion of the program to the stereo amplifier (in this example, peripheral 24). Moreover, the controlling data stream could be configured to automatically cause the stereo amplifier 24 to enter its first mode of operation, (in this example, dolby® digital), so that the multimedia movie presentation is automatically presented to the user in an optimal format.

As mentioned above, the controlling data stream can be configured to select the mode of operation of the signal processing apparatus in prioritized fashion. For example, the controlling data stream could be configured to cause the signal processing apparatus 24 to enter the first perceived mode such as the dolby® digital or AC3 mode, if it is supported. If the apparatus 24 does not support the dolby® digital mode, the controlling data stream would direct the apparatus 24 to enter the second preferred mode such as the surround sound mode in the above example. If neither the first or second preferred modes are supported, the controlling data stream would in select a third mode. This process would continue until the most preferred mode supported by the signal processing apparatus 24 is determined. In this manner, the controlling data streams can be used to automatically configure remote receiving apparatus 12 to present the communication signals transmitted on the tuned channel in the most optimum manner supported by the apparatus 12.

Persons of ordinary skill in the art will readily appreciate that the above feature is equally applicable to a video signal processor having at least two modes of operation wherein a different visual effect occurs in the first mode than in the second mode. Exemplary modes include, but are not limited to, a wide screen mode and a normal screen mode. The controlling data streams could, for example, be configured to cause the video signal processor to enter the wide screen mode, if supported. If the video signal processor does not support the wide screen mode, the controlling data stream would direct the processor to enter the normal screen mode. This latter election need not be an active event. The controlling data stream could simply instruct the video signal processor to enter a default mode if the preferred mode identified in the controlling data stream is not supported. This default procedure is, of course, applicable in other contexts including the audio signal processing example given above.

As will be appreciated by persons of ordinary skill in the art, the controlling data streams in the above examples can be processed by a logic circuit such as a microprocessor located in the integrated receiver decoder or a microprocessor located in the switching apparatus without departing from the scope of the invention.

In accordance with the teachings of another aspect of the invention, the controlling data streams can be configured to effect the operation of a predetermined model of a predetermined type of remote receiving apparatus 12 either without effecting the operation of other types of remote receiving apparatus 12 or while effecting the operation of other types of remote receiving apparatus differently. More specifically, there are a wide range of types of remote receiving apparatus 12 including, but not limited to, integrated receiver decoders, television receivers, stereo receivers, computers, video cassette recorders, video disc players, printers and DVD players. Most, if not all, of these types of apparatus 12 are sold in various models by various manufacturers. Different models gold by a particular manufacturer often have different features and capabilities, as do different models sold by different manufacturers. The disclosed controlling data streams take advantage of these differences by including one or more codes addressed to, and recognizable by, one or more predetermined models of a predetermined type of remote receiving apparatus. For example, controlling data streams can be configured such that only televisions of a particular model can receive a particular broadcast signal.

The controlling data streams can be further refined so that only predetermined models sold by a predetermined manufacturer of a remote receiving apparatus can receive a particular broadcast. By way of example, the controlling data streams could be used to address certain models of computers sold by a manufacturer such that only users with those particular models could receive the broadcasted information which might, for example, be an updated operating system or other computer program. By way of further examples, the controlling data streams can be configured such that only owners of televisions sold by a particular manufacturer can receive a broadcast, or such that televisions sold by a first manufacturer would receive a first specified group of commercials whereas televisions sold by a second manufacturer would receive a second specified group of commercials. This latter example would be very valuable for marketing products tailored to specific demographic groups directly to those groups. For example, if it were determined that purchasers of large screen televisions were more likely to purchase an automobile costing in excess of $30,000.00, the controlling data streams could be configured to cause a commercial for a car costing over $30,000.00 to run on large screen televisions and a commercial for a less expensive vehicle (or a different product altogether) to run on other televisions.

One way to achieve this direct marketing scheme would be for the controlling data streams to instruct large screen televisions to tune to a first predetermined commercial channel (possibly carried on another satellite) during a predefined commercial break, and to instruct all other televisions to stay tuned to the first channel or to tune to a second predetermined commercial channel during the same predefined commercial break. At the end of the break, all televisions would return to the original tuned channel for a continuation of the program.

In accordance with the teachings of yet another aspect of the invention, the controlling data steams can be utilized to effect automatic satellite selection in a satellite based communication system. For example, as broadcast systems introduce new satellites into orbit, it is necessary to ensure users have access to programming on all satellites. With satellites positioned in different orbital slots, this can require the use of multiple antennas or multiple antenna receiving elements (e.g., multiple LNBs). The disclosed controlling data steams enable automatic switching between such antennas components.

Figure 3:
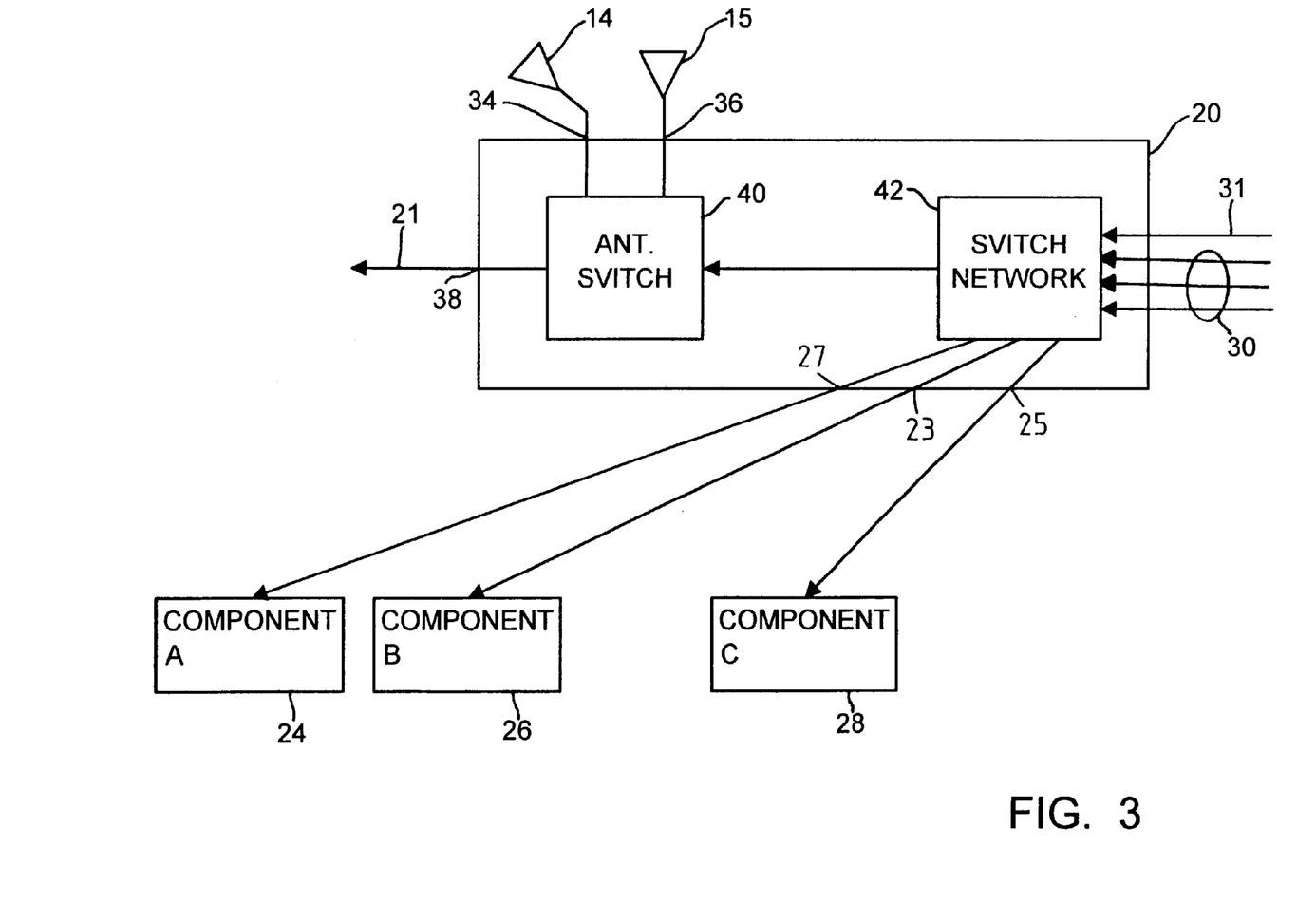
FIG. 3 is a block diagram representation of the switching apparatus employed in the remote receiving apparatus of FIG. 2.

By way of example, FIG. 3 illustrates a switching apparatus 20 configured to perform automatic satellite selections. As shown in FIG. 3, the switching apparatus 20 includes two input ports 34, 36, each of which is coupled to an antenna 14, 15. The antennas 14, 15 are directed to two different satellites. The two input ports 34, 36 are coupled to an output port 38 through a controlled switch 40. Depending on the position of the controlled switch 40, either input port 34 or input port 35 will be coupled to output port 38. In the illustrated embodiment, data bus 21 (see FIG. 2) is coupled to the output port 38. Persons of ordinary skill in the art will appreciate that communications to switch 42 or switch 41 from the IRD 22 may be effected by superimposing control signals on lines 30 or by transmitting control signals from the IRD 22 on line 21.

Persons of ordinary skill in the art will appreciate that, although switches 40, 42 are shown as separate devices in FIG. 3, they may optionally be implemented by one integrated component. Similarly, although for simplicity of illustration the antennas 14, 15 in FIG. 3 have been illustrated as separate devices, persons of ordinary skill in the art will readily appreciate that antennas 14, 15 could comprise antenna receiving elements associated with a common reflector and positioned at different foci of the reflector without departing from the scope or the spirit of the invention. As used throughout this document, the term "antenna receiving element" includes a stand alone antenna as shown in FIG. 3 and/or the entirety of, or a subset of an antenna element associated with a common reflector as described above.

In operation, a broadcaster transmits the entirety of certain programs over a first satellite and controlling data steams on corresponding channels over a second satellite. The controlling data steams on the second satellite indicate that the programming for their corresponding channel is being carried on the first satellite. Of course, the second satellite will likewise carry the entirety of (or subset of) certain other programs on other channels.

Figure 4:
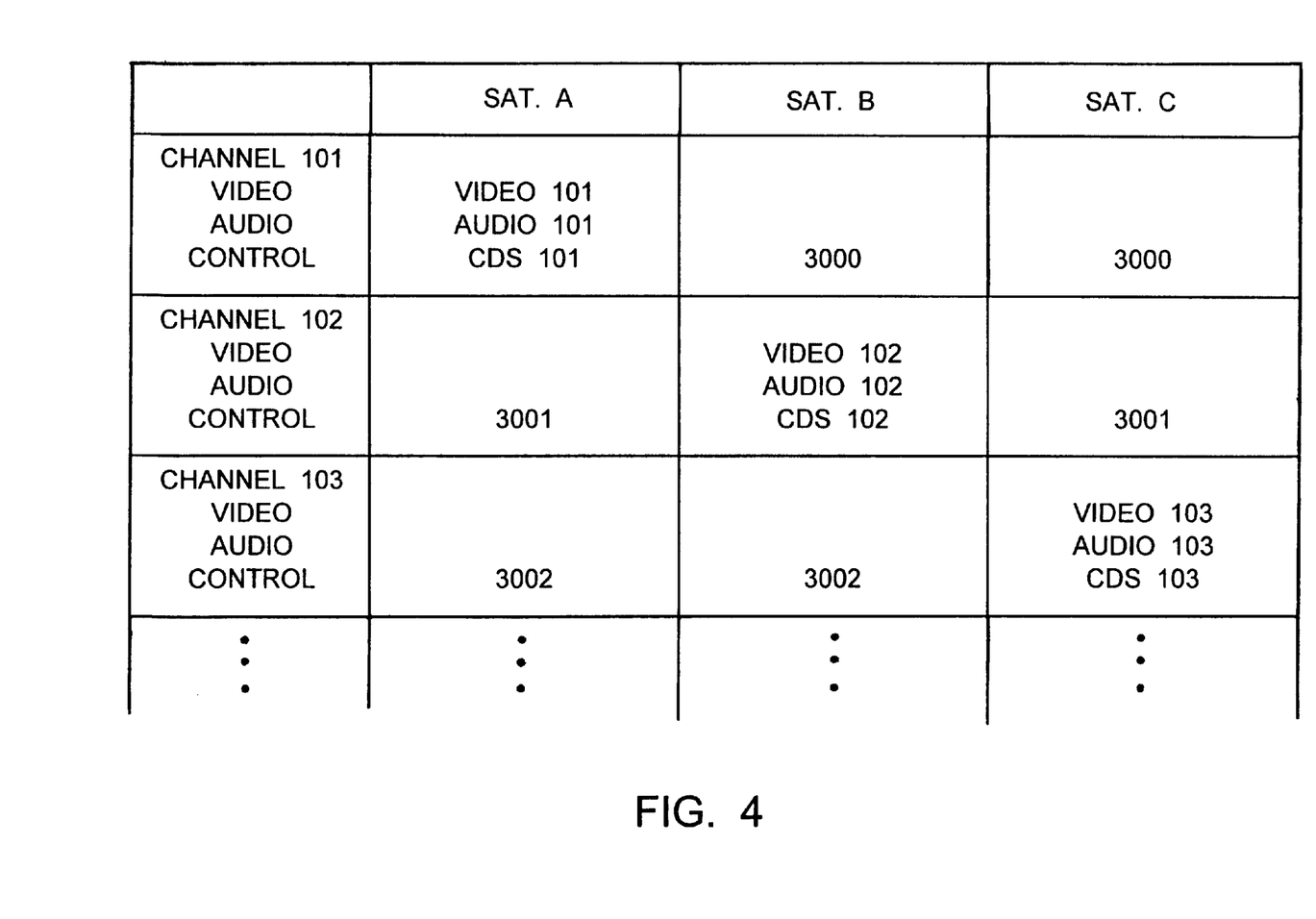
FIG. 4 is a sample VCBC map.

A viewer-channel-to-broadcast-channel (VCBC) map illustrating an example in which three separate satellites (Satellite A, Satellite B, and Satellite C) broadcast signals on viewer channels 101, 102 and 103 is shown in FIG. 4. As shown in that figure, the audio and video programming (audio 101, video 101) for channel 101 is carried on satellite A along with one or more controlling data stream (CDS 101). Satellites B and C carry controlling data streams (3000) on channel 101 instructing viewers to select Satellite A for the audio and video programming for channel 101. Similarly, Satellite B carries the audio, visual, and controlling data stream programming (audio 102, video 102 and CDS 102) for channel 102 whereas Satellites A and C each carry a controlling data stream (3001) advising viewers to select Satellite B to view the audio and video programming associated with channel 102. Finally, Satellite C carries the audio, visual and controlling data stream programming (audio 103, video 103, and CDS 103) associated with channel 103, while in this example, Satellites A and B each carry a controlling data stream (3003) instructing viewers to select Satellite C for the audio and visual programming for channel 103. As explained below, the controlling data streams 3000, 3001, 3002 instructing the viewers to select another satellite may optionally be omitted.

In any event, if, for instance, the IRD 22 tunes to a specified channel on a first antenna 14 which carries a controlling data stream indicating that the programming is being carried on the satellite associated with the second antenna 15, the IRD 22 will transmit an appropriate signal to the switch network 42 of the switching apparatus 20 via line 31, and the switch network 42 will cause the controlled switch 40 to connect the second antenna 15 to the output port 38. (Optionally, the IRD 22 may control the antenna switch 40 via line 21.) Thus, the controlling data stream enables the remote receiving apparatus 12 to automatically select the appropriate satellite for the channel the user wishes to view. The selection is performed without user involvement (other than tuned channel selection).

Although in the above example, the recognition of the controlling data stream instructing the remote receiving apparatus 12 to select the other satellite was performed by the IRD 22, those skilled in the art will appreciate that such recognition could be performed by the switching apparatus 20. To this end the switching apparatus 20 can be provided with a logic circuit such as a microprocessor. Such a logic circuit could likewise govern the routing of signals to the peripherals 24, 26 and 28 via the switching network 42.

Although in the above described embodiments, the switching apparatus 20 has been depicted as a device external to the IRD 22, those skilled in the art will readily appreciate that the switching apparatus 20 can likewise be integral with the IRD 22 without departing from the scope or spirit of the invention. An exemplary embodiment of such an IRD 22 is illustrated in FIG. 5.

Figure 5:
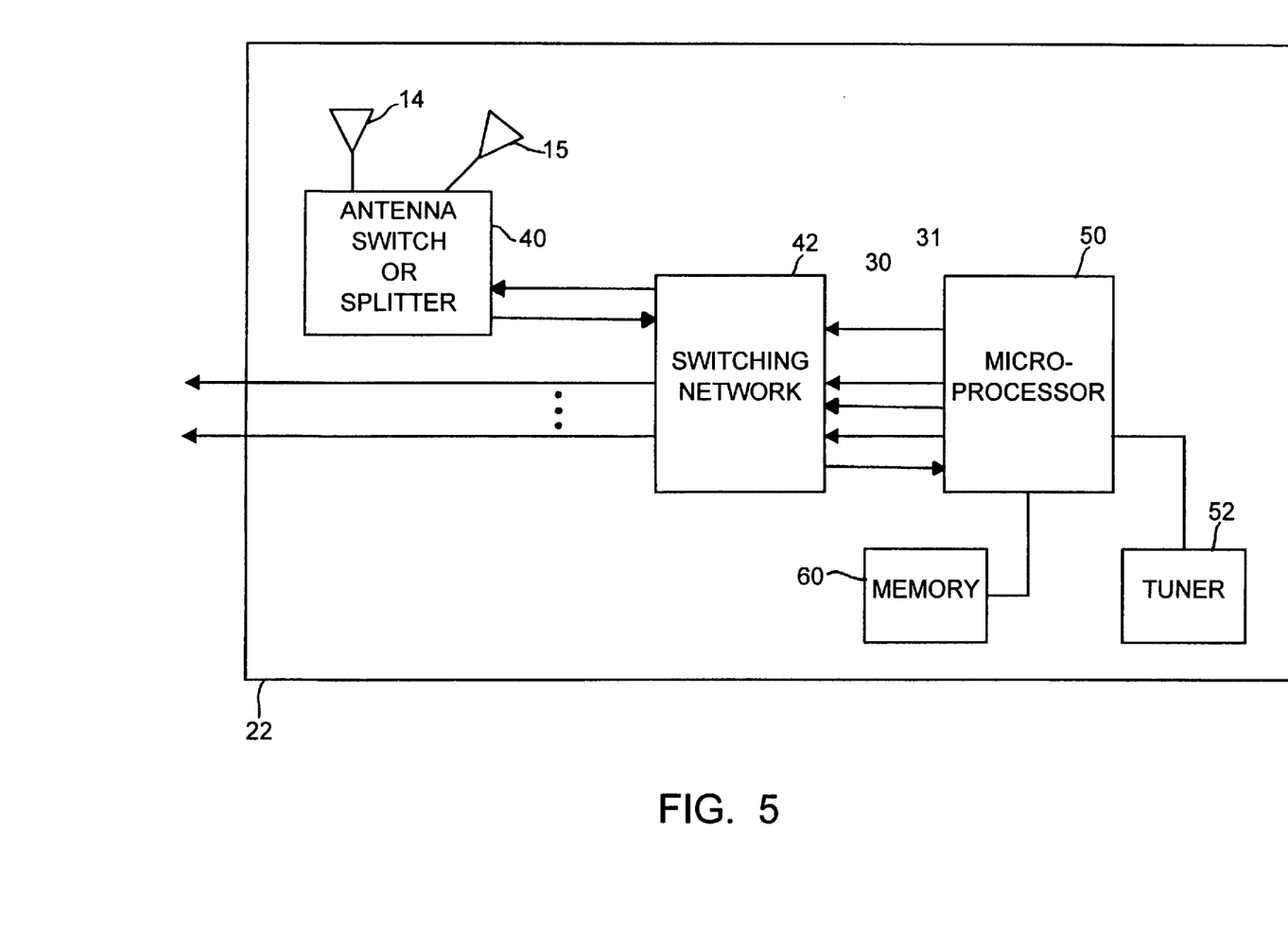
FIG. 5 is a block diagram representation of an alternative remote receiving apparatus constructed in accordance with the teachings of the invention.

As shown in FIG. 5, the IRD 22 is provided with a logic circuit in the form of microprocessor 50 for decoding received signals and controlling the overall operation of the device. The IRD 22 is provided with a tuner 52 which can be manipulated by a user to select a tuned channel from the plurality of channels received by the device 22. The IRD 22 can optionally be provided with two antennas 14, 15 and an antenna switch 40 which is operable to effect satellite switching as described above in connection with FIG. 3.

In order to perform signal routing to attached peripherals in accordance with the techniques described above, the IRD 22 of this embodiment is also provided with a switching network 42 having a plurality of output ports. As in the earlier embodiment, in the device illustrated in FIG. 5, the switching network 42 is coupled to the microprocessor 50 via audio, video and data lines 30, as well as control line 31. Also like the earlier described embodiments, control line 31 may be optionally eliminated and control data may be optionally superimposed on data lines 30.

Persons of ordinary skill in the art will readily appreciate that, although for simplicity of illustration, only two antennas 14, 15 are shown in FIGS. 2, 3 and 5, any other number of antennas could likewise be employed without departing from the scope or spirit of the invention.

The receiving apparatus 12 can be adapted to identify which antenna is coupled to which input port of the switching network 42 in numerous manners without departing from the scope of the invention. For example, the antennas could be connected to the input ports of the switching network 42 in a predefined manner (e.g., antenna A pointed at satellite A coupled to input port A, antenna B pointed at satellite B coupled to input port B, etc.). Under such an approach, the controlling data stream(s) concerning satellite selection preferably identify the satellite to be connected by instructing the remote receiving apparatus 12 to cause the switching network 42 to connect a particular input port to the output port. For example, in a scenario where a user viewing a television program on a first tuned channel carried on satellite A and received via antenna A coupled to input port A wishes to view a second program on a second channel carried on satellite B and received via antenna B coupled to input port B, upon receiving an instruction to change to the second channel the remote receiving apparatus 12 preferably first looks to satellite A where it finds a controlling data stream broadcast on the second tuned channel. The controlling data stream instructs the remote receiving apparatus 12 to connect input port B (which, in this example, is predefined to be coupled to the antenna directed at satellite B) to the output port(s) of the switching network 42 such that the second program can be received.

Although the above approach is acceptable, it is somewhat susceptible to human error in that it requires the installer of the remote receiving apparatus 12 and the antennas 14, 15 to correctly connect the antennas to appropriate ones of the input ports of the switching network 42 in compliance with the predefined connecting scheme. For instances, in the above example, if antenna B directed to satellite B had been erroneously coupled to input port C, the remote receiving apparatus 12 would have been unable to receive the desired second program.

One way to overcome such a difficulty is to provide the remote receiving apparatus 12 with a default satellite polling routine wherein, if following the directions of the controlling data streams does not result in location of the desired second program, the switching network 42 sequentially couples each input port to its output port and the desired tuned channel is viewed on each connected satellite until the second program is located. Under such an approach, the second program can be identified by the fact that it does not include a controlling data stream directing the remote receiving apparatus 12 to select another input port. It should be emphasized that, during this default routine, the directions of the controlling data streams concerning the location of the second program are ignored because it has been determined that the antennas are incorrectly coupled to the input ports of the switching network 42 and/or the controlling data streams contain erroneous information.

In embodiments employing VCBC maps (discussed further below), the desired channel can be acquired by use of the following default routine. Until the desired program is located, the switching network 42 sequentially couples each input port to its output port. The VCBC map in each output signal is found and a search for the presence of the desired channel in the VCBC is then performed. If the channel is in the VCBC map, a determination is made as to whether a controlling data stream re-directing the apparatus to another satellite input port is present. If no VCBC map is found, the desired channel is considered to be not present. If the desired channel is present in the VCBC map, and no redirection stream is present in the VCBC map, the desired channel has been located.

While polling, if the VCBC map information acquired from the satellite does not include a configuration for, a mention of, or a reference to, the desired tuned channel, then the satellite connection being examined is deemed erroneous and polling of the satellite ports should continue. The VCBC map of the proper satellite does configure the desired program's service. The aforementioned VCBC map is preferably part of the satellite's program guide or system information that configures the digital multiplex of the satellite's transport stream and data packets into program services.

To avoid the potential for human error associated with requiring antennas aligned with specific satellites to be coupled to specific input ports of the switching network 42, the remote receiving apparatus 12 is preferably adapted to automatically identify each connected satellite based on the frequency and/or the polarization of the programs broadcast by the satellite and/or on the orbit location of the satellite. Under this approach, rather than specifying an input port, the controlling data streams which are broadcast on the satellite (s) not carrying the actual program preferably specify the frequency, polarization, and orbit location where the program can be found. The remote receiving apparatus 12 preferably utilizes the information provided by the controlling data stream to couple the appropriate input port to the output port of the switching network 42.

The remote receiving apparatus 12 preferably achieves this automatic satellite selection in the following manner. Preferably, the antennas 14, 15 of the apparatus 12 include antenna receiving elements (e.g., LNBs) which are responsive to command codes to each output a polarity from the satellite it monitors. After the antennas 14, 15 are properly aligned with their respective satellites, the antenna receiving elements are controlled by the IRD 22 (or, optionally, by an intermediate switch) to output the polarities of their corresponding satellites. The control signals from the IRD may comprise voltage level signals, tone signals, modulated tone signals, or a combination of these approaches. The LNBs are preferably designed with frequency allocations to avoid interfering with one another, and to provide a characteristic satellite "footprint".

The IRD 22 responds to the controlling data stream(s) by selecting a mode from the LNB(s). Regardless of the input port configuration, each LNB receives the same mode command. The LNBs then output their footprints (i.e., the polarization information and the LNB frequency) either individually or as a combined RF signal. The IRD 22 then utilizes the information from the LNBs to deterministically find the correct satellite input port. Each LNB is then known to be aligned to a particular satellite carrying broadcast services by the polarization characteristics and the frequency footprinting.

In accordance with the teachings of a further aspect of the invention, means for mapping one or more controlling data stream(s) to a plurality of user channels is provided. In the embodiment illustrated in FIG. 4, data comprising a viewer-channel-to-broadcast-channel (VCBC) map and one or more controlling data streams are transmitted over the broadcast communication system. The VCBC map correlates the controlling data stream(s) to the user channels being broadcast. The VCBC map and the controlling data stream(s) are received by the remote receiving apparatus, (comprising, in the illustrated embodiment, IRD 22), where they are stored in a memory 60 associated with the logic circuit. The logic circuit, (in this embodiment microprocessor 50), then accesses the VCBC map when the user selects a tuned channel to determine if one or more controlling data stream is associated with the tuned channel. If the VCBC map indicates that one or more controlling data stream is associated with the tuned channel, the logic circuit retrieves the controlling data stream(s) identified in the VCBC map from memory and then proceeds just as if the controlling data stream had been received on the tuned channel.

Persons of ordinary skill in the art will appreciate that the VCBC map can be utilized with controlling data streams exhibiting any of the features described above (either simultaneously or at different times), if desired. For example, the VCBC map can be utilized with controlling data streams which are adapted to select a mode of operation of a remote receiving apparatus, with controlling data streams which are adapted to facilitate satellite selection; and/or with controlling data streams which are adapted to effect at least one predetermined model of a predetermined type of remote receiving apparatus differently than at least one other predetermined model of the predetermined type of remote receiving apparatus without departing from the scope of the invention.

In the preferred embodiment, the VCBC map and/or the controlling data streams are broadcasted periodically, (for example, once every hour) and the VCBC map is adapted to accurately map the controlling data streams to the user channels for at least as long as the time between transmissions. Of course, the VCBC map is preferably updated as needed for each transmission. For example, if a first controlling data stream is mapped to channel 32 for the time period of 9:00 AM–10:00 AM, but a different, second controlling data stream is to be associated with channel 32 for the time period of 10:00 AM –11:00 AM, the VCBC map broadcast at 8:45 AM would be different from the VCBC map broadcast at 9:45 AM in that the 8:45 AM VCBC map would map the first controlling data stream to channel 32 wherein the 9:45 AM VCBC map would map the second controlling data stream to that channel.

The use of the VCBC map is advantageous in that it does not utilize as much broadcast capacity as individually broadcasting the controlling data streams with their associated user channels. This is particularly true in instances where the same controlling data stream is to be associated with more than one user channel because such a controlling data stream need only be broadcast once. The VCBC map then maps the multiple user channels to the same controlling data stream stored in the memory of the remote receiving apparatus 12, and the logic circuit retrieves it when the user tunes to any one of the associated user channels.

Persons of ordinary skill in the art will appreciate that although the VCBC map has been termed a viewer channel to broadcast channel map, it is in no way limited to use with video signals or video signal channels. On the contrary, it is equally applicable to video, audio, web and data signals (and mixtures thereof) and to channels carrying any or all of those types of signals. Persons of ordinary skill in the art will also appreciate that the VCBC map can be configured to include the controlling data streams or to include pointers to the controlling data streams saved independently in memory without departing from the scope or the spirit of the invention. In the preferred embodiment, however, the controlling data streams are saved independently of the VCBC map to limit broadcast time. For example, all controlling data streams can be broadcasted once a day (for example, in the middle of the night) and saved in the memory of the remote receiving apparatus 12. The VCBC map, which contains pathnames to the controlling data streams in memory and is, thus, much shorter than it would be had it contained the actual controlling data streams, is broadcasted at much more frequent intervals throughout the day (e.g., once an hour). The more frequent broadcast of the VCBC map is preferred because its contents will typically change throughout the day. Of course, a more extensive VCBC map can be broadcast less frequently if it reflects the controlling data stream changes over a correspondingly longer length of time without departing from the scope or the spirit of the invention.

It will be appreciated by those skilled in the art that controlling data streams in any of the foregoing embodiments can comprise analog or digital codes. Moreover, those skilled in the art will appreciate that controlling data streams in any of the foregoing embodiments can be configured to trigger responses at an absolute time such as 1:00 PM Eastern time; or at a time after the expiration of a predetermined delay period referenced to absolute time, to time of receipt, or to an event in the transmitted data without departing from the scope of the invention.

Finally, those skilled in the art will appreciate that, although the invention has been described in connection with certain embodiments, there is no intent to limit the invention thereto. On the contrary, the intention of this application is to cover all modifications and embodiments fairly falling within the scope of the appended claims either literally or under the doctrine of equivalents.

What is claimed is:

1. For use with a broadcast communication system for delivering a plurality of channels to a plurality of remote users, a remote receiving apparatus comprising:

an output port;

a first antenna receiving element for receiving information from the broadcast communication system;

a logic circuit coupled to the first antenna receiving element and having an associated memory and an associated tuner, the tuner being adapted to select a tuned channel from the plurality of channels, the logic circuit receiving a viewer-channel-to-broadcast-channel (VCBC) map and storing the VCBC map in the memory, the VCBC map mapping a first controlling data stream to a first one of the plurality of channels and a second controlling data stream to a second one of the plurality of channels, wherein, when the tuner selects the first one of the channels, the logic circuit addresses the VCBC map and outputs the first controlling data stream to the output port and, when the tuner selects the second one of the channels, the logic circuit addresses the VCBC map and outputs the second controlling data stream to the output port, the second controlling data stream being structured to direct performance of a non-tuning operation.

2. A remote receiving apparatus as defined in claim 1 wherein the first controlling data stream comprises at least one code.

3. A remote receiving apparatus as defined in claim 2 wherein the second controlling data stream comprises at least one code.

4. A remote receiving apparatus as defined in claim 1 wherein the first and second controlling data streams are substantially identical.

5. A remote receiving apparatus as defined in claim 1 wherein the first and second controlling data streams are different.

6. A remote receiving apparatus as defined in claim 1 wherein at least a portion of the VCBC map is broadcasted periodically.

7. A remote receiving apparatus as defined in claim 6 wherein the periodic broadcasts of the VCBC map update the VCBC map stored in the memory.

8. A remote receiving apparatus as defined in claim 1 wherein the logic circuit comprises a microprocessor.

9. A remote receiving apparatus as defined in claim 1 wherein the logic circuit comprises an integrated receiver decoder.

10. A remote receiving apparatus as defined in claim 1 wherein the VCBC map maps the first controlling data stream to at least two of the plurality of channels.

11. A remote receiving apparatus as defined in claim 1 wherein the logic circuit receives and stores the first and second controlling data streams in the memory.

12. For use with a broadcast communication system for delivering a plurality of channels to a plurality of remote users, a remote receiving apparatus comprising:

an output port;

first antenna receiving element for receiving information from the broadcast communication system;

a logic circuit coupled to the first antenna receiving element and having an associated memory and an associated tuner, the tuner being adapted to select a tuned channel from the plurality of channels, the logic circuit receiving a viewer-channel-to-broadcast-channel (VCBC) map and storing the VCBC map in the memory, the VCBC map mapping a first controlling data stream to a first one of the plurality of channels and a second controlling data stream to a second one of the plurality of channels, wherein, when the tuner selects the first one of the channels, the logic circuit addresses the VCBC map and outputs the first controlling data stream to the output port and, when the tuner selects the second one of the channels, the logic circuit addresses the VCBC map and outputs the second controlling data stream to the output port, wherein the VCBC map stores controlling data streams for less than all of the channels wherein at least one of the controlling data streams is adapted to effect a non-tuning operation.

13. A remote receiving apparatus as defined in claim 12 wherein the first controlling data stream comprises at least one code.

14. A remote receiving apparatus as defined in claim 13 wherein the second controlling data stream comprises at least one code.

15. A remote receiving apparatus as defined in claim 12 wherein the first and second controlling data streams are substantially identical.

16. A remote receiving apparatus as defined in claim 12 wherein the first and second controlling data streams are different.

17. A remote receiving apparatus as defined in claim 12 wherein at least a portion of the VCBC map is broadcasted periodically.

18. A remote receiving apparatus as defined in claim 17 wherein the periodic broadcasts of the VCBC map update the VCBC map stored in the memory.

19. A remote receiving apparatus as defined in claim 12 wherein the logic circuit comprises a microprocessor.

20. A remote receiving apparatus as defined in claim 12 wherein the logic circuit comprises an integrated receiver decoder.

21. A remote receiving apparatus as defined in claim 12 wherein the VCBC map stores a controlling data stream for each of the channels.

22. A remote receiving apparatus as defined in claim 12 wherein the VCBC map maps the first controlling data stream to at least two of the plurality of channels.

23. A remote receiving apparatus as defined in claim 12 wherein the logic circuit receives and stores the first and second controlling data streams in the memory.

24. For use with a broadcast communication system for delivering a plurality of channels to a plurality of remote users, a remote receiving apparatus comprising:
an output port;
a first antenna receiving element for receiving information from the broadcast communication system;
a logic circuit coupled to the first antenna receiving element and having an associated memory and an associated tuner, the tuner being adapted to select a tuned channel from the plurality of channels, the logic circuit receiving a viewer-channel-to-broadcast-channel (VCBC) map and storing the VCBC map in the memory, the VCBC map mapping a first controlling data stream to a first one of the plurality of channels and a second controlling data stream to a second one of the plurality of channels, wherein, when the tuner select the first one of the channels, the logic circuit addresses the VCBC map and outputs the first controlling data stream to the output port and, when the tuner selects the second one of the channels, the logic circuit addresses the VCBC map and outputs the second controlling data stream to the output port; and
a first signal processing apparatus coupled to the output port and having at least two modes of operation, the first signal processing apparatus manipulating the information in a different manner to produce a different output in a first mode than in a second mode of operation; wherein, when the tuner selects the first one of the channels, the first controlling data stream selects the mode of operation for the first signal processing apparatus.

25. A remote receiving apparatus as defined in claim 24 wherein the first controlling data stream prioritizes the first and second modes of operation of the first signalling apparatus such that, if a preferred mode of operation is not supported by the first signal processing apparatus, the first signal processing apparatus will enter a next preferred mode of operation.

26. A remote receiving apparatus as defined in claim 24 wherein the first signal processing apparatus comprises an audio signal processor.

27. A remote receiving apparatus as defined in claim 26 wherein the audio signal processor output has a different aural effect in the first mode than in the second mode.

28. A remote receiving apparatus as defined in claim 27 wherein the first mode comprises one of the group comprising: an AC3 mode, a surround sound mode, a stereo mode and a monaural mode.

29. A remote receiving apparatus as defined in claim 28 wherein the second mode comprises one of the group comprising: an AC3 mode, a surround sound mode, a stereo mode and a monaural mode.

30. A remote receiving apparatus as defined in claim 27 wherein the audio signal processor is associated with a television.

31. A remote receiving apparatus as defined in claim 27 wherein the audio signal processor is associated with a stereo receiver.

32. A remote receiving apparatus as defined in claim 24 wherein the first signal processing apparatus comprises a video signal processor.

33. A remote receiving apparatus as defined in claim 32 wherein the video signal processor output has a different visual effect in the first mode than in the second mode.

34. A remote receiving apparatus as defined in claim 32 wherein the first mode comprises one of the group comprising: a wide screen mode and a normal screen mode.

35. A remote receiving apparatus as defined in claim 34 wherein the second mode comprises one of the group comprising: a wide screen mode and a normal screen mode.

36. A remote receiving apparatus as defined in claim 24 further comprising a second signal processing apparatus and a switching apparatus, wherein the output port comprises first and second output ports, the first signal processing apparatus being coupled to the first output port and the second signal processing apparatus being coupled to the second output port, the switching apparatus being responsive to the first controlling data stream to route at least a first portion of a signal received on the tuned channel to a first selected one of the first and second signal processing apparatus.

37. A remote receiving apparatus as defined in claim 36 wherein the switching apparatus routes a second portion of the signal to a second selected one of the first and second signal processing apparatus.

38. A remote receiving apparatus as defined in claim 37 wherein the first portion of the signal comprises an audio signal and the second portion of the signal comprises a video signal.

39. A remote receiving apparatus as defined in claim 38 wherein the first selected one comprises an audio signal processor and the second selected one comprises a video signal processor.

40. A remote receiving apparatus as defined in claim 24 wherein the first controlling data stream instructs the first signal processing apparatus to enter the selected mode of operation at a predefined time.

41. A remote receiving apparatus as defined in claim 40 wherein the predefined time comprises an absolute time.

42. A remote receiving apparatus as defined in claim 40 wherein the predefined time comprises a relative time.

43. A remote receiving apparatus as defined in claim 24 wherein the first controlling data stream comprises at least one code.

44. A remote receiving apparatus as defined in claim 43 wherein the second controlling data stream comprises at least one code.

45. A remote receiving apparatus as defined in claim 24 wherein the first and second controlling data streams are substantially identical.

46. A remote receiving apparatus as defined in claim 24 wherein the first and second controlling data streams are different.

47. A remote receiving apparatus as defined in claim 24 wherein at least a portion of the VCBC map is broadcasted periodically.

48. A remote receiving apparatus as defined in claim 47 wherein the periodic broadcasts of the VCBC map update the VCBC map stored in the memory.

49. A remote receiving apparatus as defined in claim 24 wherein the logic circuit comprises a microprocessor.

50. A remote receiving apparatus as defined in claim 24 wherein the logic circuit comprises an integrated receiver decoder.

51. A remote receiving apparatus as defined in claim 24 wherein the VCBC map stores a controlling data stream for each of the channels.

52. A remote receiving apparatus as defined in claim 24 wherein the VCBC map maps the first controlling data stream to at least two of the plurality of channels.

53. A remote receiving apparatus as defined in claim 24 wherein the logic circuit receives and stores the first and second controlling data streams in the memory.

54. For use with a broadcast communication system for delivering a plurality of channels to a plurality of remote users, at least one of the remote users having a signal processing device a remote receiving apparatus comprising:

an output port for operatively connecting the signal processing device to the remote receiving apparatus;

a first antenna receiving element for receiving information from the broadcast communication system;

a logic circuit coupled to the first antenna receiving element and having an associated memory and an associated tuner, the tuner being adapted to select a tuned channel from the plurality of channels, the logic circuit receiving a viewer-channel-to-broadcast-channel (VCBC) map and storing the VCBC map in the memory, the VCBC map mapping a first controlling data stream to a first one of the plurality of channels and a second controlling data stream to a second one of the plurality of channels, wherein, when the tuner selects the first one of the channels, the logic circuit addresses the VCBC map and outputs the first controlling data stream to the output port to cause the signal processing apparatus to perform a first non-tuning operation, and, when the tuner selects the second one of the channels, the logic circuit addresses the VCBC map and outputs the second controlling data stream to the output port to cause the signal processing apparatus to perform a second non-tuning operation which is different from the first non-tuning operation; and a switching device coupled to the output port, a first input port in communication with the first antenna receiving element, and a second input port in communication with a second antenna receiving element, the switching device being adapted to switch between a first configuration wherein the first input port is coupled to the output port and a second configuration wherein the second input port is coupled to the output port, the switching device being responsive to the first controlling data stream to switch from the first configuration to the second configuration.

55. A receiving apparatus as defined in claim 54 wherein the switching device comprises an integrated receiver decoder.

56. A receiving apparatus as defined in claim 55 wherein the tuner is integral to the integrated receiver decoder.

57. A receiving apparatus as defined in claim 54 further comprising an integrated receiver decoder wherein the switching device and integrated receiver decoder are located in separate housings.

58. A receiving apparatus as defined in claim 57 wherein the switching device is located at the first antenna receiving element.

59. A remote receiving apparatus as defined in claim 54 wherein the first controlling data stream comprises at least one code.

60. A remote receiving apparatus as defined in claim 59 wherein the second controlling data stream comprises at least one code.

61. A remote receiving apparatus as defined in claim 54 wherein the first and second controlling data streams are different.

62. A remote receiving apparatus as defined in claim 54 wherein at least a portion of the VCBC map is broadcasted periodically.

63. A remote receiving apparatus as defined in claim 62 wherein the periodic broadcasts of the VCBC map update the VCBC map stored in the memory.

64. A remote receiving apparatus as defined in claim 54 wherein the logic circuit comprises a microprocessor.

65. A remote receiving apparatus as defined in claim 54 wherein the logic circuit comprises an integrated receiver decoder.

66. A remote receiving apparatus as defined in claim 54 wherein the VCBC map stores a controlling data stream for each of the channels.

67. A remote receiving apparatus as defined in claim 54 wherein the VCBC map maps the first controlling data stream to at least two of the plurality of channels.

68. A remote receiving apparatus as defined in claim 54 wherein the logic circuit receives and stores the first and second controlling data streams in the memory.

69. For use with a broadcast communication system for delivering a plurality of channels to a plurality of remote users, a remote receiving apparatus comprising:

first and second output ports;

a first antenna receiving element for receiving information from the broadcast communication system;

a logic circuit coupled to the first antenna receiving element and having an associated memory and an associated tuner, the tuner being adapted to select a tuned channel from the plurality of channels, the logic circuit receiving a viewer-channel-to-broadcast-channel (VCBC) map and storing the VCBC map in the memory, the VCBC map mapping a first controlling data stream to a first one of the plurality of channels and a second controlling data stream to a second one of the plurality of channels, wherein, when the tuner selects the first one of the channels, the logic circuit addresses the VCBC map and outputs the first controlling data stream to at least one of the first and second output ports and, when the tuner selects the second one of the channels, the logic circuit addresses the VCBC map and outputs the second controlling data stream to at least one of the first and second output ports;

a switching device coupled to the first and second output ports; and first and second signal processing apparatus coupled to the first and second output ports, the switching device being responsive to the first controlling data stream to route a first portion of a signal received on the tuned channel to a first selected one of the first and second signal processing apparatus and a second portion of the signal to a second selected one of the first and second signal processing apparatus, the second portion being different from the first portion wherein at least one of the controlling data streams is adapted to effect a non-tuning operations.

70. A remote receiving apparatus as defined in claim 69 wherein the first portion of the signal comprises an audio signal and the second portion of the signal comprises a video signal.

71. A remote receiving apparatus as defined in claim 70 wherein the first selected one comprises an audio signal processor and the second selected one comprises a video signal processor.

72. For use with a broadcast communication system for delivering a plurality of channels to a plurality of remote users, a remote receiving apparatus comprising:
an output port;
a first antenna receiving element for receiving information from the broadcast communication system;
a logic circuit coupled to the first antenna receiving element and having an associated memory and an associated tuner, the tuner being adapted to select a tuned channel from the plurality of channels, the logic circuit receiving a viewer-channel-to-broadcast-channel (VCBC) map and storing the VCBC map in the memory, the VCBC map mapping a first controlling data stream to a first one of the plurality of channels and a second controlling data stream to a second one of the plurality of channels, wherein, when the tuner selects the first one of the channels, the logic circuit addresses the VCBC map and outputs the first controlling data stream to the output port and, when the tuner selects the second one of the channels, the logic circuit addresses the VCBC map and outputs the second controlling data stream to the output port;
a switching device coupled to the output port;
a first inputn port in communication with the first antenna receiving element; and
a second input port in communication with a second antenna receiving element, the switching device being adapted to switch between a first configuration wherein the first input port is coupled to the output port and a second configuration wherein the second input port is coupled to the output port, the switching device being responsive to a third controlling data stream received via the first antenna receiving element to switch from the first configuration to the second configuration, wherein the first controlling data stream instructs the switching device to switch from the first configuration to the second configuration at a predefined time wherein at least one of the controlling data streams is adapted to effect a non-tuning operation.

73. A remote receiving apparatus as defined in claim 72 wherein the predefined time comprises an absolute time.

74. A remote receiving apparatus as defined in claim 72 wherein the predefined time comprises a relative time.

75. A remote receiving apparatus as defined in claim 72 wherein the first controlling data stream comprises at least one code.

76. A remote receiving apparatus as defined in claim 75 wherein the second controlling data stream comprises at least one code.

77. A remote receiving apparatus as defined in claim 72 wherein the first and second controlling data streams are substantially identical.

78. A remote receiving apparatus as defined in claim 72 wherein the first and second controlling data streams are different.

79. A remote receiving apparatus as defined in claim 72 wherein at least a portion of the VCBC map is broadcasted periodically.

80. A remote receiving apparatus as defined in claim 79 wherein the periodic broadcasts of the VCBC map update the VCBC map stored in the memory.

81. A remote receiving apparatus as defined in claim 72 wherein the logic circuit comprises a microprocessor.

82. A remote receiving apparatus as defined in claim 72 wherein the logic circuit comprises an integrated receiver decoder.

83. A remote receiving apparatus as defined in claim 72 wherein the VCBC map stores a controlling data stream for each of the channels.

84. A remote receiving apparatus as defined in claim 72 wherein the VCBC map maps the first controlling data stream to at least two of the plurality of channels.

85. A remote receiving apparatus as defined in claim 72 wherein the logic circuit receives and stores the first and second controlling data streams in the memory.

86. For use with a broadcast communication system for delivering a plurality of channels to a plurality of remote users, a remote receiving apparatus comprising:
an output port;
a first antenna receiving element for receiving information from the broadcast communication system;
a logic circuit coupled to the first antenna receiving element and having an associated memory and an associated tuner, the tuner being adapted to select a tuned channel from the plurality of channels, the logic circuit receiving a viewer-channel-to-broadcast-channel (VCBC) map and storing the VCBC map in the memory, the VCBC map mapping a first controlling data stream to a first one of the plurality of channels and a second controlling data stream to a second one of the plurality of channels, wherein, when the tuner selects the first one of the channels, the logic circuit addresses the VCBC map and outputs the first controlling data stream to the output port and, when the tuner selects the second one of the channels, the logic circuit addresses the VCBC map and outputs the second controlling data stream to the output port, wherein the first controlling data stream is adapted to effect the operation of a first predetermined model of a predetermined type of a plurality of remote receiving apparatus differently than a second predetermined model of the predetermined type of the plurality of remote receiving apparatus.

87. A remote receiving apparatus as defined in claim 86 wherein at least one of the plurality of remote receiving apparatus comprises one of the group comprising: a television, a stereo receiver, a computer, a video cassette recorder, a video disc player, a DVD player and a printer.

88. A remote receiving apparatus as defined in claim 86 wherein the first controlling data stream is adapted to effect only the first predetermined model sold by a predetermined manufacturer.

89. A remote receiving apparatus as defined in claim 86 wherein the first controlling data stream effects the operation of the first predetermined model at an absolute time.

90. A remote receiving apparatus as defined in claim 86 wherein the first controlling data stream effects the operation of the first predetermined model at a relative time.

91. A remote receiving apparatus as defined in claim 86 wherein the first controlling data stream effects the operation of the second predetermined model at an absolute time.

92. A remote receiving apparatus as defined in claim 86 wherein the first controlling data stream effects the operation of the second predetermined model at a relative time.

93. A remote receiving apparatus as defined in claim 86 wherein the first controlling data stream effects the operation of the first predetermined model by causing the first predetermined model to receive information ignored by the second predetermined model.

94. A remote receiving apparatus as defined in claim 86 wherein the first controlling data stream effects the operation of the first predetermined model by causing the first predetermined model to tune to a different channel.

95. A remote receiving apparatus as defined in claim 86 wherein the first controlling data stream effects the operation of the first predetermined model by causing the first predetermined model to tune to a first channel for a predetermined time period.

96. A remote receiving apparatus as defined in claim 95 wherein the first controlling data stream causes the first predetermined model to return to an original channel upon which the first controlling data stream was received after the predetermined time period.

97. A remote receiving apparatus as defined in claim 95 wherein the first channel carries at least one commercial advertisement.

98. A remote receiving apparatus as defined in claim 97 wherein the at least one commercial advertisement is directed towards a demographics group with which the first predetermined model is associated.

99. A remote receiving apparatus as defined in claim 95 wherein the first controlling data stream effects the operation of the second predetermined model by causing the second predetermined model to tune to a second channel for the predetermined time period.

100. A remote receiving apparatus as defined in claim 99 wherein the first controlling data stream causes the second predetermined model to return to an original channel upon which the first controlling data stream was received after the predetermined time period.

101. A remote receiving apparatus as defined in claim 99 wherein the second channel carries at least one commercial advertisement.

102. A remote receiving apparatus as defined in claim 101 wherein the at least one commercial advertisement is directed towards a demographics group with which the second predetermined model is associated.

103. A remote receiving apparatus as defined in claim 86 wherein the first controlling data stream is adapted to effect only the second predetermined model sold by a predetermined manufacturer.

104. A remote receiving apparatus as defined in claim 86 wherein the first controlling data stream comprises at least one code.

105. A remote receiving apparatus as defined in claim 104 wherein the second controlling data stream comprises at least one code.

106. A remote receiving apparatus as defined in claim 86 wherein the first and second controlling data streams are substantially identical.

107. A remote receiving apparatus as defined in claim 86 wherein the first and second controlling data streams are different.

108. A remote receiving apparatus as defined in claim 86 wherein at least a portion of the VCBC map is broadcasted periodically.

109. A remote receiving apparatus as defined in claim 108 wherein the periodic broadcasts of the VCBC map update the VCBC map stored in the memory.

110. A remote receiving apparatus as defined in claim 86 wherein the logic circuit comprises a microprocessor.

111. A remote receiving apparatus as defined in claim 86 wherein the logic circuit comprises an integrated receiver decoder.

112. A remote receiving apparatus as defined in claim 86 wherein the VCBC map stores a controlling data stream for each of the channels.

113. A remote receiving apparatus as defined in claim 86 wherein the VCBC map maps the first controlling data stream to at least two of the plurality of channels.

114. A remote receiving apparatus as defined in claim 86 wherein the logic circuit receives and stores the first and second controlling data streams in the memory.

115. For use with a broadcast communication system for delivering a plurality of channels to a plurality of remote users, a remote receiving apparatus comprising:
an output port;
a first antenna receiving element for receiving information from the broadcast communication system;
a logic circuit coupled to the first antenna receiving element and having an associated memory and an associated tuner, the tuner being adapted to select a tuned channel from the plurality of channels, the logic circuit receiving a viewer-channel-to-broadcast-channel (VCBC) map and storing the VCBC map in the memory, the VCBC map mapping a first controlling data stream to a first one of the plurality of channels and a second controlling data stream to a second one of the plurality of channels, wherein, when the tuner selects the first one of the channels, the logic circuit addresses the VCBC map and outputs the first controlling data stream to the output port and, when the tuner selects the second one of the channels, the logic circuit addresses the VCBC map and outputs the second controlling data stream to the output port, wherein the VCBC map stores a first pathname identifying a location of the first controlling data stream in memory, wherein the VCBC map maps the first controlling data stream to at least two of the plurality of channels wherein at least one of the controlling data streams is adapted to effect a non-tuning operations.

116. A remote receiving apparatus as defined in claim 115 wherein the VCBC map stores a second pathname identifying a location of the second controlling data stream in memory.

117. A remote receiving apparatus as defined in claim 115 wherein the first controlling data stream comprises at least one code.

118. A remote receiving apparatus as defined in claim 117 wherein the second controlling data stream comprises at least one code.

119. A remote receiving apparatus as defined in claim 115 wherein the first and second controlling data streams are substantially identical.

120. A remote receiving apparatus as defined in claim 115 wherein the first and second controlling data streams are different.

121. A remote receiving apparatus as defined in claim 115 wherein at least a portion of the VCBC map is broadcasted periodically.

122. A remote receiving apparatus as defined in claim 121 wherein the periodic broadcasts of the VCBC map update the VCBC map stored in the memory.

123. A remote receiving apparatus as defined in claim 115 wherein the logic circuit comprises a microprocessor.

124. A remote receiving apparatus as defined in claim 115 wherein the logic circuit comprises an integrated receiver decoder.

125. A remote receiving apparatus as defined in claim 115 wherein the VCBC map stores a controlling data stream for each of the channels.

126. A remote receiving apparatus as defined in claim 115 wherein the logic circuit receives and stores the first and second controlling data streams in the memory.

127. For use with a broadcast communication system for delivering a plurality of channels to a plurality of remote users, a remote receiving apparatus comprising:

an output port;

a first antenna receiving element for receiving information from the broadcast communication system;

a logic circuit coupled to the first antenna receiving element and having an associated memory and an associated tuner, the tuner being adapted to select a tuned channel from the plurality of channels, the logic circuit receiving a viewer-channel-to-broadcast-channel (VCBC) map and storing the VCBC map in the memory, the VCBC map mapping a first controlling data stream to a first one of the plurality of channels and a second controlling data stream to a second one of the plurality of channels, wherein, when the tuner selects the first one of the channels, the logic circuit addresses the VCBC map and outputs the first controlling data stream to the output port and, when the tuner selects the second one of the channels, the logic circuit addresses the VCBC map and outputs the second controlling data stream to the output port, wherein the logic circuit receives and stores the first and second controlling data streams in the memory, and wherein the VCBC map is broadcasted more frequently than the first and second controlling data streams, wherein the VCBC map maps the first controlling data stream to at least two of the plurality of channels wherein at least one of the controlling data streams is adapted to effect a non-tuning operation.

128. A remote receiving apparatus as defined in claim 127 wherein the first controlling data stream comprises at least one code.

129. A remote receiving apparatus as defined in claim 128 wherein the second controlling data stream comprises at least one code.

130. A remote receiving apparatus as defined in claim 127 wherein the first and second controlling data streams are substantially identical.

131. A remote receiving apparatus as defined in claim 127 wherein the first and second controlling data streams are different.

132. A remote receiving apparatus as defined in claim 127 wherein at least a portion of the VCBC map is broadcasted periodically.

133. A remote receiving apparatus as defined in claim 132 wherein the periodic broadcasts of the VCBC map update the VCBC map stored in the memory.

134. A remote receiving apparatus as defined in claim 127 wherein the logic circuit comprises a microprocessor.

135. A remote receiving apparatus as defined in claim 127 wherein the logic circuit comprises an integrated receiver decoder.

136. A remote receiving apparatus as defined in claim 127 wherein the VCBC map stores a controlling data stream for each of the channels.

137. A remote receiving apparatus as defined in claim 127 wherein the logic circuit receives and stores the first and second controlling data streams in the memory.

138. For use with a broadcast communication system for delivering a plurality of channels to a plurality of remote users, a method comprising the steps of:

developing a first VCBC map mapping a first controlling data stream structured to direct performance of a non-tuning operation to at least a first one of the plurality of channels and a second controlling data stream structured to direct performance of a non-tuning operation to at least the first one of the plurality of channels; and broadcasting the first VCBC map, wherein the first VCBC map maps the first and second controlling data streams to the channels for a predefined time period.

139. A method as recited in claim 138 further comprising the steps of:

developing a second VCBC map mapping a third controlling data stream to at least one of the plurality of channels for a second predefined time period; and, broadcasting the second VCBC map.

140. A method as defined in claim 139 wherein the first and third controlling data streams are identical.

141. A method as defined in claim 139 wherein the first and third controlling data streams are different.

142. A method as defined in claim 139 wherein the second and third controlling data streams are identical.

143. A method as defined in claim 139 wherein the second and third controlling data streams are different.

* * * * *